US012286259B2

(12) United States Patent
Stamatiou et al.

(10) Patent No.: US 12,286,259 B2
(45) Date of Patent: Apr. 29, 2025

(54) REDUCING TACK OF ADHESIVE OOZE ON COMPONENTS USED IN LABELING AND PACKAGING

(71) Applicant: Multi-Color Corporation, Batavia, OH (US)

(72) Inventors: Dimitri Stamatiou, Green Bay, WI (US); Mark A. Shadle, Peachtree City, GA (US)

(73) Assignee: Multi-Color Corporation, Batavia, OH (US)

(*) Notice: Subject to any disclaimer, the term of this patent is extended or adjusted under 35 U.S.C. 154(b) by 30 days.

(21) Appl. No.: 17/835,519

(22) Filed: Jun. 8, 2022

(65) Prior Publication Data

US 2022/0388704 A1 Dec. 8, 2022

Related U.S. Application Data

(60) Provisional application No. 63/208,226, filed on Jun. 8, 2021.

(51) Int. Cl.

| | |
|---|---|
| ***B65C 5/02*** | (2006.01) |
| ***B65C 9/24*** | (2006.01) |
| ***G09F 3/02*** | (2006.01) |
| *B65C 9/00* | (2006.01) |

(52) U.S. Cl.

CPC .................. *B65C 9/24* (2013.01); *B65C 5/02* (2013.01); *B65C 2009/0003* (2013.01); *G09F 2003/025* (2013.01)

(58) Field of Classification Search

None

See application file for complete search history.

(56) References Cited

U.S. PATENT DOCUMENTS

| | | | | |
|---|---|---|---|---|
| 2007/0020423 A1* | 1/2007 | Chamandy | G09F 3/10 | 428/40.1 |
| 2010/0112263 A1* | 5/2010 | Lorence | B65C 9/26 | 156/60 |
| 2012/0258271 A1* | 10/2012 | Maughan | C09J 7/38 | 427/256 |
| 2019/0147773 A1* | 5/2019 | Cockerell | B32B 43/006 | 40/675 |
| 2022/0153509 A1* | 5/2022 | Schnakenberg | B65D 85/10568 | |

FOREIGN PATENT DOCUMENTS

| | | | |
|---|---|---|---|
| DE | 102019106620 A1 * | 9/2020 | A24F 15/12 |

* cited by examiner

*Primary Examiner* — Laura C Powers

(74) *Attorney, Agent, or Firm* — Wood Herron & Evans LLP

(57) ABSTRACT

Apparatus and methods for reducing the tack of adhesive ooze around components and other materials associated with articles and labeling and packaging of articles. In some embodiments, the packaging includes a substrate, an adhesive, a component, a de-tackifying agent, and an ooze zone. The substrate may be a shrink sleeve label. The adhesive may be a pressure sensitive adhesive used to attach the component to the substrate. The component may be a smart component or a promotional material. The de-tackifying agent may reduce the tackiness of the adhesive that oozes (i.e., progresses) beyond the interface of the component and the substrate into an adjacent ooze zone when heat, pressure, or heavy coat weight is applied to the packaging.

20 Claims, 1 Drawing Sheet

REDUCING TACK OF ADHESIVE OOZE ON COMPONENTS USED IN LABELING AND PACKAGING

FIELD OF THE INVENTION

The present invention generally relates to label and packaging materials, and particularly to methods of adhering items such smart components to a label or a packaging.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Over the past several years, packaging companies have been associating smart components with various articles, such as by embedding components (e.g., smart components) in or with labels or packaging for such articles. Such smart components may include electronic article surveillance (EAS) tags, but may also include (but are not limited to) radio frequency identification (RFID) tags, near field communication (NFC) tags, and some internet of things (IoT) tags. When associated with a label and/or packaging, the smart component (e.g., electronic circuitry such as an antenna, semiconductor chips, capacitors, resistors, etc.) is generally associated with at least one layer of the label or packaging.

One popular method of decorating articles, or packages containing articles, is via the use of shrink sleeve labels. Shrink sleeve labels include a shrink film that typically includes decoration (such as visible graphics, text, and/or other indicia). These shrink films can be applied to cover a portion of an article, or the entire article, or to cover a package containing multiple articles, and can conform to innovative shapes, which may be more attractive to buyers at the point of purchase.

The process of shrink labeling an article involves sizing a shrink film, which may be a tubular shrink sleeve, to a particular article. Then one shrinks the film to snugly wrap the article within the shrink sleeve. The shrinking process is generally accomplished by the application of heat or steam to the shrink sleeve. The film has an inherent tension that is released by heating the film from the outside in a shrink oven. As the film then cools, it shrinks snugly around the article. This shrinkage applies a pressure to the article, which aids in holding the shrink film to the article. In alternate embodiments, an adhesive may be applied to the inner surface of the shrink sleeve.

One problem that arises with shrink films (or other labels or packaging), with respect to smart components, involves the adhesives that are used to apply such smart components. For example, pressure sensitive adhesives are commonly used in attaching smart components (such as EAS, RFID, NFC devices) to film packaging materials such as shrink sleeves and wraps as used on consumer products. Typically, the adhesives used in these applications are highly aggressive in adhesion with high tack. This characteristic of high tack is useful so that the adhesive can firmly and/or permanently adhere the smart component(s) to the low surface energy films and/or printed graphics found in such labels or packaging. However, one negative characteristic associated with such adhesives is that they tend to ooze when subjected to elevated temperatures, heavy coat weights, and/or pressure. In other words, the adhesive is typically applied such that it is positioned between the smart component and any adjacent surface (such as surface of a shrink film). But at elevated temperatures, heavy coat weights, or pressure, the adhesive may move or progress from the initial location to an area beyond the smart component, which can cause one or more issues. For example, while the ooze is primarily confined to the area around the perimeter of the smart component itself, it can be easily transferred to another surface (such as the outer surface of a wrap or sleeve) and can also build up on manufacturing equipment or application equipment (i.e., applicator). Such build-up can cause line stoppage and unscheduled cleanings of the equipment. These problems can also present when using such adhesives with materials other than smart components that one may wish to associate with a label or packaging—such as coupons, promotional materials, etc.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Aspects of the present invention reduce or eliminate the issues described above with high tack adhesives used with labeling or packaging (particularly when used with smart components or other materials, such as coupons or promotional materials). In that regard, one aspect of the present invention provides a process of de-tackifying the portion of the adhesive that has progressed (i.e., oozed) beyond the interface between smart component and film surface. In various embodiments, this may be accomplished by the inclusion of, or application of, a de-tackifying agent to the label or packaging. Such de-tackifying agent may be applied to an ooze zone corresponding to an area substantially matching any expected or anticipated area that may receive adhesive that oozes beyond the interface between smart component and film of the label or packaging with which the smart component is associated. This may be done whether the component to be attached using an adhesive is attached to the packaging or to the article. Alternatively, the de-tackifying agent may be applied to an area substantially matching the area of the smart component and any ooze zone. Still alternatively, the de-tackifying agent may be coated over a larger area, such as by being flood coated over the surface of the film including the smart component.

Another aspect of the present invention includes a label or packaging including a substrate (e.g., a film substrate), a component (e.g., a smart component), and an adhesive positioned between the component and the substrate (to adhere the component to the substrate). In some embodiments, the substrate is a shrink-sleeve film. The adhesive used may be a pressure sensitive adhesive. In some embodiments, the pressure sensitive adhesive may be selected from the group consisting of a hot melt pressure sensitive adhesive, an emulsion pressure sensitive adhesive, and a solvent acrylic pressure sensitive adhesive. In one embodiment, the adhesive includes a hot melt pressure sensitive adhesive. In one embodiment, the component may include a smart component. In another embodiment, the component may include a promotional material.

The label or packaging also includes a de-tackifying agent positioned at least in an ooze zone corresponding to an area substantially matching any expected or anticipated area that may receive adhesive that oozes beyond the interface between smart component and film of the label or packaging with which the smart component is associated. Alternatively, the de-tackifying agent may be positioned at least in an area substantially matching the area of the smart component and any ooze zone. Still alternatively, the de-tackifying agent may be coated over a larger area, such as by being flood coated over the surface of the film including the smart component.

Thus, certain embodiments of the invention may include a label or packaging to be affixed to an article or articles, comprising (1) a substrate, (2) a component having a perimeter, (3) an adhesive having a tackiness, (3) an ooze zone, and (4) a de-tackifying agent, wherein the de-tackifying agent is applied to the substrate at the ooze zone. The adhesive affixes the component to the substrate defining an interface of the component and the substrate. The ooze zone defines an area of the substrate adjacent to the perimeter of the component that corresponds to the anticipated area where the adhesive may ooze or progress beyond the interface of the component and the substrate when heat, pressure, or heavy coat weight is applied to the packaging. And the de-tackifying agent reduces the tackiness of the adhesive that oozes or progresses past the interface of the component and the substrate.

This process, or the use of such a label or packaging, may reduce or eliminate the negative effects of any post-application oozing of adhesive once the smart component is adhered to a substrate and subjected to high temperature and pressure typical of the application process—or if applied at heavy coat weights. This also can result in the significant reduction of equipment down-time due to adhesive ooze issues that was described above. In one embodiment, the de-tackifying agent may reduce the adhesive transfer from the packaging to the manufacturing equipment, reducing the down time of the packaging manufacturing equipment. In another embodiment, the de-tackifying agent may reduce the adhesive transfer from the packaging to the application equipment, reducing the down time of the packaging application equipment. Additionally, or alternatively, the de-tackifying agent may reduce or eliminate the static discharge. In some embodiments of the invention, the de-tackifying agent may be a mixture including silicone and the typical chemical composition associated with the type of coating and/or varnish in the particular system being utilized.

Another aspect of the invention is directed to a method of manufacturing a label or packaging having a de-tackifying agent applied to a substrate. Such method includes (1) attaching a component having a perimeter to the substrate with an adhesive, and (2) applying a de-tackifying agent to the substrate in an ooze zone adjacent to the perimeter of the component, wherein the ooze zone corresponds to an anticipated area of where the adhesive may ooze or progress past the perimeter of the component when heat, pressure, or heavy coat weight is applied to the label or packaging.

A further aspect of the invention is directed to a method of attaching a label or packaging to an article comprising (1) attaching a component having a perimeter to the article with an adhesive, wherein an area adjacent to the perimeter of the component defines an ooze zone which corresponds to an anticipated area of where the adhesive may ooze or progress past the perimeter of the component when heat, pressure, or heavy coat weight is applied to the label or packaging; (2) applying a de-tackifying agent to the substrate in an area corresponding to the ooze zone; and (3) attaching the label or packaging to the article such that the de-tackifying agent interfaces with the ooze zone.

These and other advantages of the application will be apparent to those of skill in the art with reference to the drawings and the detailed description below.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1A:
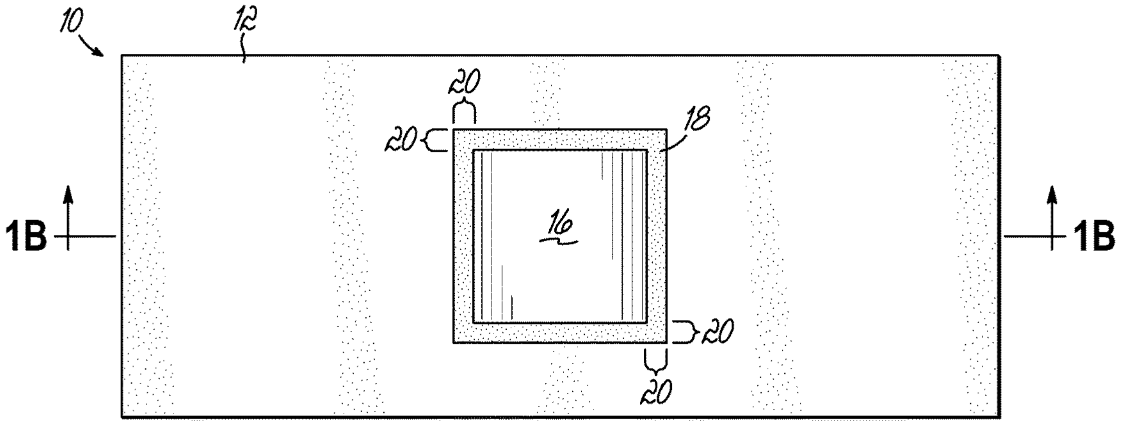
FIG. 1A is a front view of an embodiment of the packaging in accordance with the principles of the invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, aspects of the present invention reduce or eliminate the issues described above with high tack adhesives used with a label or packaging (particularly when used with smart components or other materials, such as coupons or promotional materials). As used herein, the terms "packaging" and "label" are intended to have different meaning. The term "packaging" means a material that is designed to be used to cover at least a portion of one or more articles. The term "label" means a material that is designed to cover at least a portion of a single article. One aspect of the present invention provides a process of de-tackifying the portion of the adhesive that has progressed (i.e., oozed) beyond the interface between smart component and surface of the label or packaging. In various embodiments, this may be accomplished by the inclusion of, or application of, a de-tackifying agent to the label or packaging. The de-tackifying agent may be positioned at least in an ooze zone that corresponds to an area substantially matching any expected or anticipated area that may receive adhesive that oozes beyond the interface between smart component and film of the label or packaging with which the smart component is associated. Alternatively, the de-tackifying agent may be positioned at least in an area substantially matching the area of the smart component and any ooze zone. Still alternatively, the de-tackifying agent may be coated over a larger area, such as by being flood coated over the surface of the film including the smart component.

Another aspect of the present invention includes a label or packaging including a film and a smart component associated with the film. The label or packaging also includes a de-tackifying agent that may be positioned at least in an area substantially matching any expected or anticipated area that may receive adhesive that oozes beyond the interface between the smart component and film of the label or packaging with which the smart component is associated. Alternatively, the de-tackifying agent may be positioned at least in an area substantially matching the area of the smart component and any expected or anticipated area that may receive adhesive that oozes beyond the interface between smart component and film of the label or packaging with which the smart component is associated. Still alternatively, the de-tackifying agent may be coated over a larger area, such as by being flood coated over the surface of the film including the smart component.

When referring to the Figures described below, a layer depicted below another layer is configured to be more exterior than the other layer (i.e., more distal from the article) when the label is affixed to the article. Similarly, a layer depicted above another layer is configured to be more interior than the other layer (i.e., more proximate the article) when the label is affixed to the article. Although not shown, it should be understood that the present invention includes embodiments where the layers are reversed (i.e., flipped over a y-axis) such that what is depicted as most exterior is most interior and vice versa.

When a layer is described relative to another layer, the term "between" is understood to mean "in the space separating at least those two other layers, but not necessarily in physical contact with either of those layers." When a layer is described relative to another layer, the term "below" means "configured to be more exterior than at least that other layer, but not necessarily in physical contact with that other layer." When a layer is described relative to another layer, the term "above" means "configured to be more interior than at least that other layer, but not necessarily in physical contact with that other layer." When any of the terms "between," "above," or "below," are modified by directly (e.g., directly between), then the described layer must be in physical contact with at least a portion of the other layer(s).

Figure 1B:
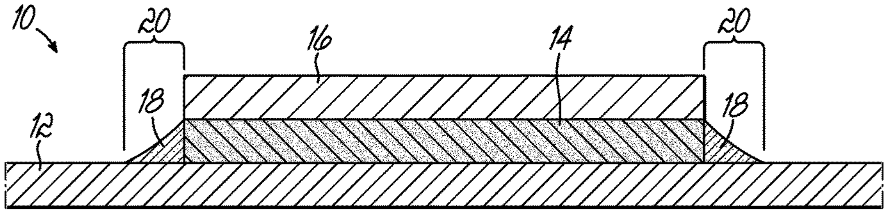
FIG. 1B is a cross-sectional view of the embodiment of FIG. 1A taken along cross-section line 1B-1B in accordance with the principles of the invention.

With reference to FIGS. 1A and 1B, an embodiment of a packaging 10 in accordance with the principles of the invention is shown. The packaging 10 includes a substrate 12, an adhesive 14 (see FIG. 1B), a component 16, and a de-tackifying agent 18. The packaging 10 further has an ooze zone 20 that corresponds to an area where the adhesive 14 may progress (i.e., ooze) beyond the interface or overlap between the substrate 12 and the component 16 when, for example, heat, pressure, and/or a heavy coat weight is applied to the packaging 10. Put differently, the ooze zone 20 is adjacent to the perimeter of the component 16. As shown in FIG. 1B, the adhesive 14 may be positioned between the substrate 12 and the component 16 such that the area of the adhesive 14 corresponds with the area of the component 16. In one embodiment, the adhesive 14 has an area corresponding to the area of component 16 and is positioned directly between the substrate 12 and the component 16 such that the component 16 is attached to the substrate 12. The de-tackifying agent 18 may be applied to the substrate 12 around the perimeter of the component 16 such that the de-tackifying agent 18 is above the substrate 12. In one embodiment, the de-tackifying agent 18 may be applied to the substrate 12 such that the de-tackifying agent 18 is directly above the substrate 12 and the area of the de-tackifying agent 18 corresponds to the area of the ooze zone 20. In one embodiment, the packaging 10 is designed to cover at least a portion of more than one article. In a further embodiment thereof, the packaging 10 is designed to function as a shrink packaging. In another embodiment, the packaging 10 is designed to be a label (i.e., cover at least a portion of a single article). In a further embodiment thereof, the packaging 10 is designed to function as a shrink sleeve label (as discussed further below).

The substrate 12 may include a film so that the packaging 10 functions as a label. In such embodiments, the substrate 12 may include materials such as, for example, polyethylene terephthalate (PET), polypropylene (PP), polyvinyl chloride (PVC), other suitable plastics or polymers, or combinations thereof. In one embodiment, the substrate 12 may include PET and/or resins designed to be compatible with PET such as, for example, virgin PET and/or recycled PET (rPET). Various types of PET, with different functions, may be used in the substrate 12 such as, for example, crystalized PET (CPET), biaxially oriented PET (BOPET), transverse directionally oriented PET (TDO PET), glycol modified PET (PETG), other types of PET, or combinations thereof. The type of PET used may be selected so that the substrate 12 can be used to impart desired properties on the packaging 10. For example, the substrate 12 may include PETG that exhibits greater shrinkage in the transverse direction (TD) than the machine direction (MD) when heat is applied such that the substrate 12 is suitable for use in a shrink-sleeve label or packaging. One non-limiting example of such an embodiment is the Bonpet 10 supplied by the Bonset America Corporation (commercially available under the same product name). The Bonpet 10 is a PETG film with average properties including a 50 μm thickness, a 3.5% haze, a greater TD tensile strength than MD tensile strength, a greater MD tensile elongation and tear strength than TD tensile elongation and tear strength, a 8.1 MPa shrinkage stress, a 0.266 coefficient of friction, a 7.6N ring crush, and a 42 dyne/cm surface tension.

Although aspects of the substrate 12 have been described above in the context of the packaging 10, it should be understood that the substrate 12, when included in embodiments such as those depicted in other Figures as described below, may exhibit similar properties and/or contain similar materials.

The adhesive 14 may include, for example, a pressure sensitive adhesive that is activated by the application of pressure. Depending on the embodiment, the adhesive 14 may include a chemistry that enables pressure sensitive functionality such as, for example, a hot melt adhesive, an acrylic adhesive that is water based (e.g., an emulsion acrylic), another type of acrylic adhesive (such as a solvent acrylic adhesive), some other suitable pressure sensitive adhesive, or some combination thereof. In one embodiment, the adhesive 14 is or includes a hot melt adhesive that is applied to the desired location by melting the adhesive at a high temperature (e.g., 300-400° F.), has a viscosity greater than or equal to 5,000 cps and less than or equal to 150,000 cps, and/or is subsequently prone to oozing when subjected to increased temperature, increased pressure, or a heavy coat weight is applied. In one embodiment, the adhesive 14 is or includes an emulsion acrylic adhesive that is applied to the desired location by dispersing an acrylic adhesive in a polar solvent (e.g., water), has a viscosity greater than or equal to 500 cps and less than or equal to 25,000 cps, and/or is less prone to oozing than a hot melt adhesive on average when subjected to high temperature. In one embodiment, the adhesive 14 is or includes a solvent acrylic adhesive that is applied to the desired location by dissolving an acrylic adhesive in an organic solvent, has a viscosity greater than or equal to 500 cps and less than or equal to 25,000 cps, and/or is less prone to oozing than an emulsion acrylic adhesive on average when subjected to high temperature. In one embodiment, the adhesive 14 is a strong pressure sensitive adhesive (i.e., has high tack) that attaches the component 16 to the substrate 12 such that the component 16 is not easily removed from the substrate 12. In a further embodiment, the component 16 attached using a strong pressure sensitive adhesive may be, for example, an EAS tag, and RFID tag, an NFC tag, or other smart component. One non-limiting embodiment of the adhesive 14 that enables strong pressure sensitive functionality is a modified acrylic adhesive transfer tape supplied by Avery Dennison Performance Tapes (commercially available under product name FT1126). In another embodiment, the adhesive 14 is a weak pressure sensitive adhesive (i.e., has low tack) that attaches the component 16 to the substrate 12 such that the component 16 can be repositioned or removed from the substrate 12 during the attachment process. In a further embodiment, the component 16 attached using a weak pressure sensitive adhesive may be, for example, a coupon, a promotional material, or other similar item. One non-limiting embodiment of the adhesive 14 that enables weak pressure sensitive functionality is a modified acrylic adhesive transfer tape supplied by Avery Dennison (commercially available under product name FBA 8960).

In some embodiments, the adhesive 14 could be selected from a group that would otherwise exhibit negative oozing properties without the de-tackifying agent 18 such as, for example, hot melt adhesives. Unlike emulsion adhesives and solvent acrylic adhesives, hot melt adhesives typically exhibit a high degree of ooze when heat, pressure, and/or a heavy coat weight is applied to the packaging 10. The technique used to apply the adhesive 14 and/or the quantity of the adhesive 14 (i.e., coat weight) applied may vary based on the adhesive 14 chosen and the degree of ooze typically associated with its use.

The adhesive 14 may not be applied to at least one of the component 16 or the substrate 12 during the manufacturing process. In one non-limiting embodiment, the adhesive 14 may be attached to the component 16 but not the substrate 12 during manufacturing such that the user or some third party applies the component 16 to the substrate 12. In such an embodiment, a liner layer (not shown) may be applied below the adhesive 14 prior to attaching the component 16 to the substrate 12 in order to, for example, help prevent accidental attachment of the adhesive 14 to an unintended surface prior to attaching the adhesive 14 to the substrate 12. The liner layer may include a material designed to prevent unintended adhesion such as, for example, siliconized PET, siliconized paper, other suitable non-stick materials, or some combination thereof.

Although aspects of the adhesive 14 have been described above in the context of the packaging 10, it should be understood that the adhesive 14, when included in embodiments such as those depicted in other Figures as described below, may exhibit similar properties and/or contain similar materials.

The component 16 may be or include a smart component such as, for example, an EAS tag, an RFID tag, NFC tag, IoT tag, some other similar smart component, or some combination thereof. It will be recognized by those of ordinary skill in the art that, although much of the disclosure herein describes the use of adhesives to adhere a smart component to a substrate, the adhesive may also be used to adhere materials other than smart components—including, but not limited to, coupons or promotional materials. These coupons and/or promotional materials may be designed to be removable from the packaging 10 in certain embodiments. Thus, the invention is not limited solely to a label or package environment including smart components.

The component 16 may be attached to the packaging 10 in various ways such as, for example, insertion, onsertion, imbedding, other suitable methods of including additional components in a packaged article, or combinations thereof. As shown in FIGS. 1A and 1B, the component 16 is attached to the substrate 12 using the adhesive 14. However, in other embodiments, the component 16 may be attached to the article (not shown) using the adhesive 14. In such embodiments, the ooze zone 20 would correspond to an area where the adhesive 14 may ooze beyond the interface or overlap between the article and the component 16. Put differently, the ooze zone 20 would be adjacent to the perimeter of the component 16.

Although aspects of the component 16 have been described above in the context of the packaging 10, it should be understood that the component 16, when included in embodiments such as those depicted in other Figures as described below, may exhibit similar properties and/or contain similar materials.

The de-tackifying agent 18 may include a material that reduces the tackiness of the adhesive 14 that comes in contact with the de-tackifying agent 18. In certain embodiments, the de-tackifying agent 18 may include, for example, silicone, a formulation that includes silicone, a slip varnish that may or may not include silicone, an oil, a flow additive, a scratch resist additive, ammonium salts (e.g., quaternary salts), other suitable deadening agents and/or additives, or combinations thereof. The de-tackifying agent 18 may be incorporated into numerous forms of apply-able or printable media including but not limited to water based liquid carriers, hydrogels, spray-able or mist-able media, water based and solvent based printable inks and coatings, UV & LED curable inks and coatings, other similar application methods, or combinations thereof. The type of de-tackifying agent 18 and/or the percentage of the active material that enables the de-tackifying agent 18 to reduce the tackiness of the adhesive 14 incorporated into the de-tackifying agent 18 may differ due to end use requirements, applications methods, or other desired parameters. In one non-limiting example, the de-tackifying agent 18 includes a UV curable gloss shrink coating supplied by Siegwerk (commercially available under product name LSAMSXX7B2RB). In another non-limiting example, the de-tackifying agent 18 includes an LED curable matte shrink coating supplied by Siegwerk (commercially available under product name LLEDMDMX6B0X2). In yet another non-limiting embodiment, the de-tackifying agent 18 includes a water base aqua gloss overprint varnish (OPV) supplied by Siegwerk (commercially available under product name EC000005). In another non-limiting example, the de-tackifying agent 18 may be or include an oil such as, for example, petroleum-based oils, plant based oils, natural oils, synthetic oils, other similar oils, and combinations thereof.

In some embodiments, the de-tackifying agent 18 may be a mixture. In one non-limiting example, a de-tackifying agent 18 including at least one of a UV or a LED curable coating such as those described above is mixed with a silicone-based flow additive supplied by Siegwerk (commercially available under product name 81-470333-6). In one embodiment, a flow additive such as the one described above may be mixed into the de-tackifying agent 18 such that it is greater than or equal to 1% and less than or equal to 10% by weight. In another embodiment, a flow additive such as the one described above may be mixed into the de-tackifying agent 18 such that it is greater than or equal to 2% and less than or equal to 5% by weight. In a further non-limiting example, a de-tackifying agent 18 including a water base varnish such as that described above is mixed with a silicone-based scratch resist additive supplied by Siegwerk (commercially available under product name 19-471362-4). In one embodiment, a scratch resist additive such as the one described above may be mixed into the de-tackifying agent 18 such that it is greater than or equal to 1% and less than or equal to 10% by weight. In another embodiment, a scratch resist additive such as the one described above may be mixed into the de-tackifying agent 18 such that it is greater than or equal to 2% and less than or equal to 5% by weight. In another further non-limiting example, a de-tackifying agent 18 including a water-base varnish such as that described above is mixed with a silicone additive supplied by Dow Chemical (commercially available under product name HV 495 Emulsion). In one embodiment, a silicone additive such as the one described above may be mixed into the de-tackifying agent 18 such that it is greater than or equal to 2% and less than or equal to 10% by weight. In another embodiment, a silicone additive such as the one described above may be mixed into the de-tackifying agent 18 such that it is greater than or equal to 2% and less than or equal to 5% by weight.

The inclusion of the de-tackifying agent 18 may reduce or eliminate the negative effects of any post application oozing of the adhesive 14 after the component 16 is adhered to the substrate 12 such as, for example, impaired visual appearance, undesirable tactile experience, adhesive transfer and/or buildup on the packaging manufacturing equipment, adhesive transfer and/or buildup on the packaging applicator, other negative effects, or combinations thereof. In some embodiments, the de-tackifying agent 18 may eliminate or nearly eliminate the tackiness of the adhesive 14. In other embodiments, the de-tackifying agent 18 may reduce the tackiness of the adhesive 14 by greater than or equal to 99%, greater than or equal to 90%, greater than or equal to 75%, greater than or equal to 50%, or some other suitable level. In one embodiment, the de-tackifying agent 18 may reduce or eliminate the negative effects of any post application oozing of the adhesive 14 after high temperature, pressure, or heavy coat weight is applied to the packaging 10. In another embodiment, the de-tackifying agent 18 may reduce or eliminate the negative effects of any post application oozing of the adhesive 14 by reducing the tack caused by the adhesive 14. This reduction or elimination of the tackiness of the adhesive 14 where the de-tackifying agent 18 is applied may advantageously reduce issues at various points in the manufacturing process such as, for example, the application of the component 16 to the substrate 12, the application of the packaging 10 to the article, other points in the manufacturing process, or multiple points in the manufacturing process. In various embodiments, the de-tackifying agent 18 may reduce or eliminate the negative effects of any post application oozing of the adhesive 14 by containing a material that reduces or eliminates static discharge such as, for example, silicone, a formulation that includes silicone, quaternary ammonium salts, other chemistries, or some combination thereof. This reduction or elimination of static discharge may significantly help preserve the functionality and lifespan of a smart device component 16.

The application of the de-tackifying agent 18 may occur at various points in the manufacturing of the packaging 10. The application of the de-tackifying agent 18 to the substrate 12 may occur prior to applying the packaging 10 to the article (e.g., prior to forming a shrink sleeve label around a bottle). In one embodiment, the de-tackifying agent 18 may be applied to the substrate 12 after the component 16 has been applied to the substrate 12. In another embodiment, the de-tackifying agent 18 may be applied to the substrate 12 before the component 16 is attached to the substrate 12. The de-tackifying agent 18 may be applied to the packaging 10 via any suitable method such as, for example, rolling, stamping, spraying, printing (e.g., flexographic, rotary letterpress, gravure, digital, etc.), or any other application process that suits the particular circumstance. Additionally or alternatively, the de-tackifying agent 18 can be applied via aforementioned processes on the interior of the substrate 12 directly across from the location of the component 16 that is attached to the article (not shown), and once the substrate 12 has been formed onto the article surface the de-tackifying agent 18 will come into direct contact with the ooze zone 20 thus reducing the tackiness of the adhesive 14. In other words, one could apply the de-tackifying agent 18 on the opposing inside surface of the printed substrate 12 so that, when the packaging 10 is seamed or formed onto the article, the de-tackifying agent 18 would make contact with the article thus limiting any potential for adhesive 14 to transfer prior to the end use application process.

Although aspects of the de-tackifying agent 18 have been described above in the context of the packaging 10, it should be understood that the de-tackifying agent 18, when included in embodiments such as those depicted in other Figures as described below, may exhibit similar properties and/or contain similar materials.

Figure 2:
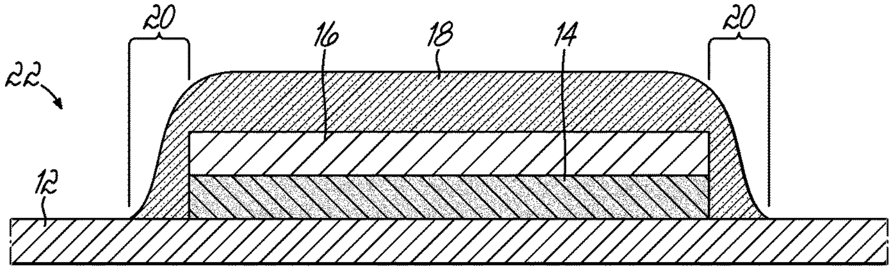
FIG. 2 is a cross-sectional view of another embodiment of the packaging in accordance with the principles of the invention.

With reference to FIG. 2, an alternate embodiment of the packaging 10, a packaging 22, in accordance with the principles of the invention is shown. The packaging 22 includes the substrate 12, the adhesive 14, the component 16, the de-tackifying agent 18, and the ooze zone 20. Unless otherwise described, the properties and descriptions set out above for the substrate 12, the adhesive 14, the component 16, the de-tackifying agent 18, and/or the ooze zone 20 may apply to the embodiment of the invention shown in FIG. 2. As shown in FIG. 2, the adhesive 14 may be positioned between the substrate 12 and the component 16 such that the area of the adhesive 14 corresponds with the area of the component 16. In one embodiment, the adhesive 14 has an area corresponding to the area of component 16 and is positioned directly between the substrate 12 and the component 16 such that the component 16 is attached to the substrate 16. Unlike the embodiment shown in FIGS. 1A and 1B, the de-tackifying agent 18 of the packaging 22 may be applied to both the substrate 12 around the perimeter of the component 16 in an area corresponding to the ooze zone 20 and to the component 16. In one embodiment, a first portion of the de-tackifying agent 18 may be applied to the substrate 12 such that it is directly above the substrate 12 and the area of the first portion of the de-tackifying agent 18 corresponds to the area of the ooze zone 20. In another embodiment, a second portion of the de-tackifying agent 18 may be applied to the component 16 such that it is directly above the component 16 and the area of the second portion of the de-tackifying agent 18 corresponds to the area of the component 16. In one embodiment, the packaging 22 is designed to cover at least a portion of more than one article. In a further embodiment thereof, the packaging 22 is designed to function as a shrink packaging. In another embodiment, the packaging 22 is designed to be a label (i.e., cover at least a portion of a single article). In a further embodiment thereof, the packaging 22 is designed to function as a shrink sleeve label (as discussed above).

Figure 3:
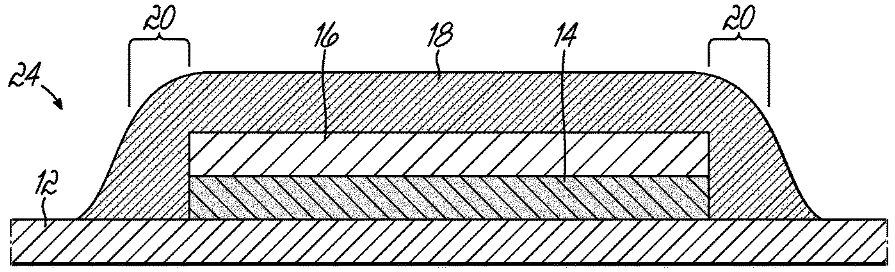
FIG. 3 is a cross-sectional view of another embodiment of the packaging in accordance with the principles of the invention.

With reference to FIG. 3, an alternate embodiment of the packaging 10, a packaging 24, in accordance with the principles of the invention is shown. The packaging 24 includes the substrate 12, the adhesive 14, the component 16, the de-tackifying agent 18, and the ooze zone 20. Unless otherwise described, the properties and descriptions set out above for the substrate 12, the adhesive 14, the component 16, the de-tackifying agent 18, and/or the ooze zone 20 may apply to the embodiment of the invention shown in FIG. 3. As shown in FIG. 3, the adhesive 14 may be positioned between the substrate 12 and the component 16 such that the area of the adhesive 14 corresponds with the area of the component 16. In one embodiment, the adhesive 14 has an area corresponding to the area of component 16 and is positioned directly between the substrate 12 and the component 16 such that the component 16 is attached to the substrate 16. Unlike the embodiment shown in FIG. 2, the de-tackifying agent 18 of the packaging 24 may be applied to both the substrate 12 around the perimeter of the component 16 in an area greater than the ooze zone 20 and to the component 16. In one embodiment, a first portion of the de-tackifying agent 18 may be applied to the substrate 12 such that it is directly above the substrate 12 and the area of the first portion of the de-tackifying agent 18 corresponds to an area including more than the ooze zone 20. In another embodiment, a second portion of the de-tackifying agent 18 may be applied to the component 16 such that it is directly above the component 16 and the area of the second portion of the de-tackifying agent 18 corresponds to the area of the component 16. In one embodiment, the packaging 24 is designed to cover at least a portion of more than one article. In a further embodiment thereof, the packaging 24 is designed to function as a shrink packaging. In another embodiment, the packaging 24 is designed to be a label (i.e., cover at least a portion of a single article). In a further embodiment thereof, the packaging 24 is designed to function as a shrink sleeve label (as discussed above).

While the present invention has been disclosed by reference to the details of preferred embodiments of the invention, it is to be understood that the disclosure is intended as an illustrative rather than in a limiting sense, as it is contemplated that modifications will readily occur to those skilled in the art, within the spirit of the invention and the scope of the claims.

What is claimed is:

1. A packaging configured to be affixed to an article, comprising:

a substrate configured to be affixed to the article;

a component having a perimeter, wherein the component is configured to be positioned between the substrate and the article when the substrate is affixed to the article;

an adhesive having a tackiness, and wherein the adhesive affixes the component to the substrate defining an interface of the component and the substrate;

an ooze zone, wherein the ooze zone defines an area of the substrate adjacent to the perimeter of the component that corresponds to an anticipated area where the adhesive may ooze or progress beyond the interface of the component and the substrate when heat, pressure, or heavy coat weight is applied to the packaging; and a de-tackifying agent, wherein the de-tackifying agent is applied to the substrate at the ooze zone, and wherein the de-tackifying agent is configured to reduce the tackiness of the adhesive that oozes or progresses past the interface of the component and the substrate.

2. The packaging of claim 1, wherein the substrate comprises a shrink sleeve film.

3. The packaging of claim 1, wherein the adhesive comprises a pressure sensitive adhesive.

4. The packaging of claim 3, wherein the adhesive comprises a hot melt pressure sensitive adhesive.

5. The packaging of claim 1, wherein the component comprises a promotional material.

6. The packaging of claim 1, wherein the component comprises a smart component.

7. The packaging of claim 6, wherein the de-tackifying agent reduces the static discharge.

8. The packaging of claim 1, wherein the de-tackifying agent is further applied to the component on a side opposite from the adhesive.

9. The packaging of claim 8, wherein the de-tackifying agent is further applied to the substrate beyond the ooze zone.

10. The packaging of claim 1, wherein the de-tackifying agent comprises:

a coating; and a silicone additive.

11. The packaging of claim 10, wherein the coating is selected from a group consisting of a UV curable coating, an LED curable coating, and a water-base overprint varnish.

12. The packaging of claim 10, wherein the silicone additive is selected from the group consisting of a silicone flow additive, a silicone scratch resist additive, and a silicone emulsion.

13. The packaging of claim 1, wherein the de-tackifying agent reduces the adhesive transferred to a packaging manufacturing device.

14. The packaging of claim 1, wherein the de-tackifying agent reduces the adhesive transferred to a packaging applicator.

15. An article comprising the packaging of claim 1.

16. A method of manufacturing a packaging having a de-tackifying agent applied to a substrate comprising:

attaching a component having a perimeter to the substrate with an adhesive, wherein the component is configured to be positioned between the substrate and the article when the substrate is affixed to the article;

applying a de-tackifying agent to the substrate in an ooze zone adjacent to the perimeter of the component, wherein the ooze zone corresponds to an anticipated area of where the adhesive may ooze or progress past the perimeter of the component when heat, pressure, or heavy coat weight is applied to the packaging.

17. The method of claim 16, wherein the de-tackifying agent is applied as a coating that covers the component and the ooze zone.

18. The method of claim 17, wherein the de-tackifying agent is applied as a coating that covers the component and extends beyond the ooze zone.

19. An article comprising a packaging manufactured using a method of manufacturing the packaging having a de-tackifying agent applied to a substrate comprising:

attaching a component having a perimeter to the substrate with an adhesive, wherein the component is configured to be positioned between the substrate and the article when the substrate is affixed to the article; and applying a de-tackifying agent to the substrate in an ooze zone adjacent to the perimeter of the component, wherein the ooze zone corresponds to an anticipated area of where the adhesive may ooze or progress past the perimeter of the component when heat, pressure, or heavy coat weight is applied to the packaging.

20. A method of attaching a packaging to an article comprising:

attaching a component having a perimeter to the article a substrate with an adhesive, wherein an area adjacent to the perimeter of the component defines an ooze zone which corresponds to an anticipated area of where the adhesive may ooze or progress past the perimeter of the component when heat, pressure, or heave coat weight is applied to the packaging;

applying a de-tackifying agent to the substrate in an area corresponding to the ooze zone; and attaching the packaging to the article such that the de-tackifying agent interfaces with the ooze zone, wherein the component is positioned between the substrate and the article.

* * * * *